April 21, 1970  L. SIMMONS ET AL  3,507,284
SURGICAL BONE CUTTER

Filed Aug. 17, 1967  2 Sheets-Sheet 1

INVENTORS
LEONARD SIMMONS
GERALD RAVITZ
BY THIER ATTORNEY

April 21, 1970   L. SIMMONS ET AL   3,507,284
SURGICAL BONE CUTTER

Filed Aug. 17, 1967   2 Sheets-Sheet 2

INVENTORS
LEONARD SIMMONS
GERALD RAVITZ
BY THIER ATTORNEY
Bertram Frank

United States Patent Office 3,507,284
Patented Apr. 21, 1970

3,507,284
SURGICAL BONE CUTTER
Leonard Simmons, 2 Miller Place, and Gerald Ravitz,
103 Oakside Drive, both of Smithtown, N.Y. 11787
Filed Aug. 17, 1967, Ser. No. 661,315
Int. Cl. A61b 17/32
U.S. Cl. 128—318     6 Claims

ABSTRACT OF THE DISCLOSURE

A surgical bone cutter comprising a spring actuated handle having a cam surface adapted to engage the rear end of a cutting blade and to move the same. A fixed blade bar is releasably insertable in the middle frame portion along with the cutting bar. The front end of the fixed blade bar is provided with an aperture which is adapted to receive a bone to be cut and when the handle is actuated the cutting bar moves across the aperture thereby cutting the bone. The aperture in the fixed blade bar is provided with a knife edge which opposes the cutting edge of the movable cutting bar so that a clean cut is made when the movable cutting bar is urged across the aperture.

---

This invention relates to a surgical instrument and more particularly to an instrument for cutting through bone tissue.

Heretofore, it has been known that when a surgeon performs an operation and it is required to cut through bone tissue the logical and most widely accepted method is the use of the surgical saw.

For many years the techniques and procedure for cutting bones have advanced to such a stage that the art must look to improvement in instruments rather than technique.

Inherent in the use of the surgical saw are a number of shortcomings which were thought to be insurmountable in view of the instruments being utilized and the surgeon was prepared to "live with" these deficiences. For example the sawing of the hard bone would cause small chips or bone dust which tended to impede the patients healing and in some instances created certain side effects detrimental to the patient. In other instances infectious areas were created. Further, the sawing would create a sharp rough edge on the cut bone which again would impede the normal healing process and in some instances would cause infection.

It is the general object of the present invention to avoid and overcome the foregoing and other difficulties found in the prior art by the provision of a bone cutting tool which is simple to use and yet more effective than the prior art devices.

Another object of the present invention is to provide a bone cutting instrument which will not create chips when in use.

Yet another object of the present invention is to provide a bone cutting instrument which will not create sharp rough edges on the cut bone.

Still another object of the present invention is to provide a bone cutting instrument which is more accessible to restricted areas.

A further object of the present invention is to provide a bone cutting instrument which will cut through hard bone with one motion rather than a sawing to and fro motion.

The objects of the present invention have been achieved by the provision of a bone cutting instrument comprising a middle frame portion, a spring actuated handle integral with said middle frame portion, a fixed cutting bar releasably insertable in said middle frame portion, a movable cutting bar releasably insertable in said middle frame portion and adapted to slide over said fixed cutting bar, means disposed on said handle for moving said movable cutting bar, and a guide clamp removably connected to said middle frame portion for holding the cutting bars and guiding the movement of said movable cutting bar, said movable cutting bar and said fixed cutting bar being insertable in said middle frame portion as a unit.

For a better understanding of the present invention reference should be had to the accompanying drawings wherein like numerals of reference indicate similar parts throughout the several views and wherein.

Although the principles of the present invention are broadly applicable to bone cutting instruments the present invention is particularly adapted to the cutting of small bones of the foot, hence it has been illustrated and will so be described without being limited thereto or thereby.

Figure 1:
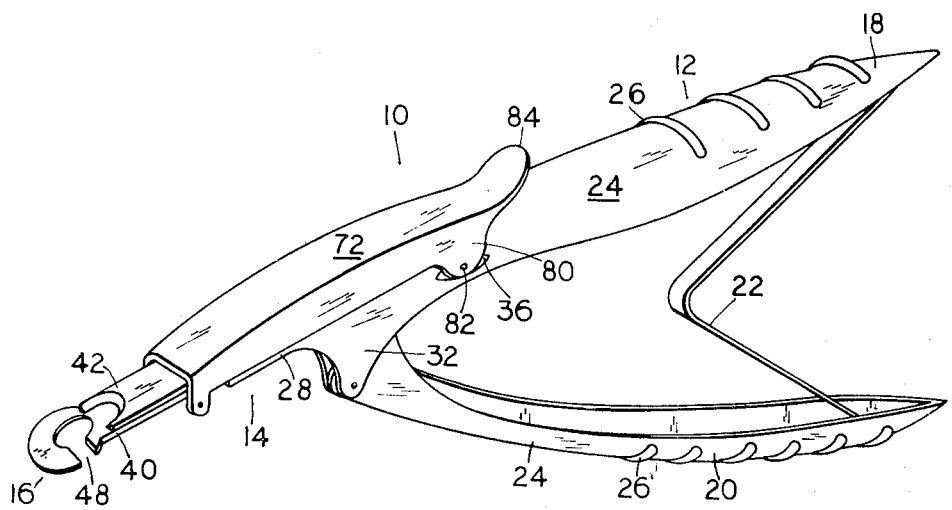
FIGURE 1 is a perspective view of the bone cutting instrument.

As shown in FIGURE 1 a bone cutting instrument is generally indicated by the reference numeral 10. The bone cutting instrument 10 is broadly comprised of three sections, a handle section 12, a middle frame portion 14, and the cutting area 16.

Figure 2:
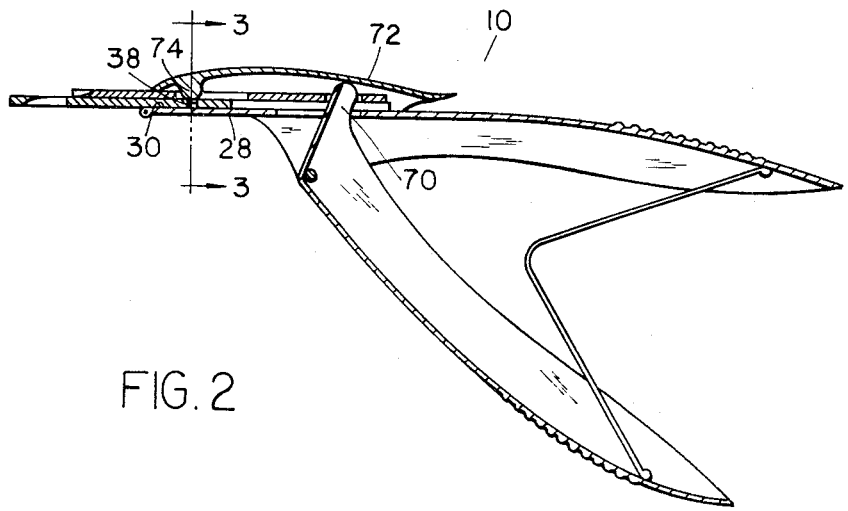
FIGURE 2 is a cross sectional view of the bone cutting instrument.
Figure 3:
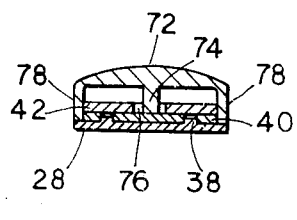
FIGURE 3 is a cross sectional view of the cutting instrument taken along lines 3—3 of FIGURE 2.

The handle section 12 may be provided with a fixed arm 18 being integral with the middle frame portion 14. In this instance, as shown in FIGURES 1 and 2 the fixed arm member may be disposed at a slight angle to the middle frame portion and in general the handle section 12 may be slanted approximately 30 from the longitudinal axis of the middle frame portion 14 and cutting area 16. This disposition has been found, through experimentation, to be most desirable for a surgeon because it requires the least amount of manipulation of instrument to change positions in the surgeons hand, and yet allows the surgeon a clear view of the bone area to be cut.

In juxaposition to the fixed arm 18 there may be disposed a movable member 20 which is pivotably connected to the middle frame portion 14. In order to keep the fixed arm member 18 and movable member 20 separated a resilient means in the form of a leaf spring 22 may be provided. Although other resilient means may be provided, the leaf spring is preferable. The outer surfaces 24 of the fixed arm 18 and movable member 20 may be provided with a plurality of grooves 26 which will afford non-slip surfaces and provide a sure grip for the surgeon.

It will be recognized that the leaf spring 22 provides a means to keep the fixed arm 18 and movable member 20 separated as well as providing a resistance against which the surgeon may squeeze the members (18, 20) together and thereafter when releasing the pressure on the members, they will be forced apart and resume their normally separated position, as shown in FIGURE 1.

Structurally, the middle frame portion may be provided with a flat extended portion 28 having a bottom surface 30 and a pair of side walls 32 extending upwardly therefrom forming a support track 24. The side walls 32, at their outer surfaces, may be provided with a dent 36 in its outer surface which may provide one element of a releasable lock hereinafter described.

The bottom surface 30 of the flat extended portion may be provided with a pair of upwardly extending protuberances 38 thereby furnishing an abutment means the purpose of which will be more liberally treated hereinafter.

Figure 4:
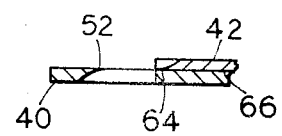
FIGURE 4 is a partial side view of the cutting area showing the alignment of the cutting edge.
Figure 5:
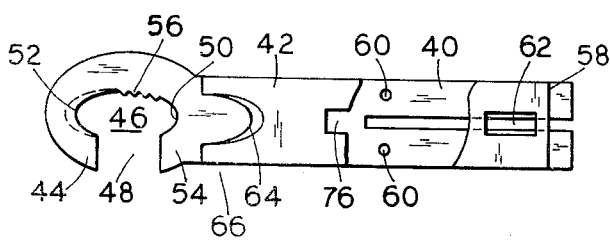
FIGURE 5 is a top view of the cutting area.

The cutting area 16 may be provided with a fixed blade bar 40 and a longitudinally movable cutting blade bar 42. The fixed blade bar 40, as shown in FIGURE 4, may be provided with an outwardly flared end portion 44 having an aperture 46 therein for receiving a bone (not shown) which is to be cut. In order to introduce the bone into the aperture 46 the outwardly flared end portion may be provided with a cut away portion 48 so that the bone to be severed may be slid into the aperture 46. With this construction, it may be seen, that when it is desired to cut a bone the entire bone will of necessity not have to be uncovered and lifted in order to be positioned in the aperture 46, instead the bone would merely be slidable through the cut away portion 48 and thereafter into the aperture 46. The inner periphery 50 of the aperture 46 may be provided with a sharp cutting edge 52 at the upper surface 54 thereof and at the extreme frontal portion of the aperture 46, as shown in FIGURES 4 and 5. The remainder of the inner periphery 50 may be provided with a plurality of raised portions or serrations 56 which may provide a positive grip area for the bone to be cut thereby preventing the bone from shifting in the aperture 46 when it is being severed.

The rear end 58 of the fixed blade bar 40 may be removably inserted in the middle frame portion 14 such that it may be removably secured on the support track 34. It should be noted that when the fixed blade bar 40 is secured in this position it is fixed against longitudinal and side to side movement, however this fixed blade bar 40 may be replaceable by longer or shorter substitutes depending on the accessibility of the bone to be cut and the desires of the surgeon.

In order to removably secure the fixed blade bar 40 in position in the middle frame portion 14, the rear end thereof may be provided with a pair of holes 60 which will be in registry with the upwardly extending protruberances 38 on the bottom surface 30 of the flat extended portion 28. It should be noted that the upwardly extending protruberances 38 do not extend completely through the holes 60 so that the top surface of the fixed blade bar 40 may be smooth presenting a clear flat unobstructed surface.

As shown in FIGURE 5 the rear end of the fixed blade bar may be provided with slot 62 such that a cam surface may be movable therein.

In order to provide the cutting motion that is required to cut a bone, a movable cutting blade bar 42 is slidably mounted atop the fixed blade bar 40 and may be urged forward such that its cutting edge 64 is permitted to close over the aperture 46. As shown in FIGURE 5 the cutting edge 64 is provided at the free end 66 of the movable cutting blade bar 42 and is generally concave in shape. This concave cutting edge 64 would tend to more positively engage the convex surface presented to it by the outer surface of the bone to be cut. The cutting edge 64 is provided at the bottom surface 68 of the movable cutting blade bar 42 such that the sharp cutting edge 52 of the fixed blade bar 40 and the sharp cutting edge 64 of the movable cutting blade bar 42 are in almost perfect alignment thereby providing a single aligned cutting face and insuring a straight cut severance of the bone. The rear end 58 of the movable cutting blade bar 42 may be removably insertable into the middle frame portion 14 such that the slot 62 may receive a cam lever 70 which may be connected to the movable member 20 of the handle section 12. With this construction the movable cutting bar 42 will be urged forward to its cutting position closing the cutting edge 64 over the aperture 46.

As previously described, the fixed and movable blade bars (40, 42) are disposed on the extended portion 28 of the middle frame portion 14 with the fixed blade bar 40 being fixed against longitudinal movement through the cooperation of the upwardly extending protruberances 38 and the holes 60 therein. In order to secure the blade bars (40, 42) against transverse movement and further to provide a guide for the forward movement of the moveable cutting blade bar 42 a snap lock guide means 72 may be positioned over the middle frame portion 14.

As shown in FIGURE 1, the snap lock guide means 72 may be hingedly mounted on the forwardmost end of the flat extended portion 28 of the middle frame means 14. A guide bar 74 internally disposed on said snap lock guide means 72 may extend downwardly therefrom and register with a second slot 76 centrally located in the movable blade bar 42 thus providing another means of guiding the forward movement of the movable cutting blade bar 42. In its locked position (shown in FIGURES 1 and 2) the downwardly turned side 78 of the snap lock guide means 72 overlaps the side edges of the extended portion 28 of the middle frame portion 14 there also providing another means for maintaining a true straight forward movement of the movable cutting blade bar 42. It will be recognized that the proper movement of the movable blade bar is essential for the cutting of a bone so that the surgeon must be certain of the sure and direct forward movement of the movable cutting blade bar 42 without any side to side excursion thereof.

The snap lock guide means 72 may be provided with a pair of downwardly extending side lips 80, each of which may be provided with a teat 82 thereon to lock in registry with the dents 36 provided in the upwardly extending side walls 32 of the middle frame portion 14. The cooperation of the dent 36 and teat 82 provide a locking means for maintaining the snap lock guide means 72 in its locked position (shown in FIGURE 1). In order to disengage the locking means, the rear end of the snap lock guide means 72 may be provided with a lip 84 which when pulled upwardly will pivot about its hinged forward portion thereby raising the snap lock guide means 72 upwardly releasing the blade bars (40, 42) from their guided and locked positions.

When the snap lock guide means 72 is in its unlocked position the fixed and movable blade bars (40, 42) are easily removable and replaceable. It may be seen therefore that a surgeon during the course of an operation may rather conveniently change blades in the bone cutting instrument rather quickly and easily, using longer or shorter blade bars as the surgical situation might dictate.

It will be recognized from the above description that the fixed and movable blade bars 40, 42 may be made in matched pairs of various lengths, each length suited for a particular purpose and situation. Further, the ease and speed at which the blade bars may be removed and replaced will lend the bone cutting instrument to many varied types of bone cutting situations, and it should be clear that this instrument although particularly well suited for the cutting of small bones may have equal application to the cutting of larger and hard bones of the body.

It should be further noted that the locking means hereinabove described may take other forms that the aligned dent 36 and teat 82 and therefore this invention should not be considered limited thereby.

Functionally reviewing the operation of the bone cutting instrument 10 it will be recognized from the above description that a bone to be cut may be slipped into the aperture 46 in the fixed blade bar 40, through the cutaway portion 48 in the outwardly flared end portion 44. With the bone in this position the movable member 20 in the handle section 12 is squeezed upwardly causing the cam lever 70, riding in the slot 62 of the movable cutting blade bar 42, to rotate forcing the movable cutting blade bar 42 to slide forwardly. The concave cutting edge 64 is forced against the bone to be cut and the sharp cutting edge 52 at the forward extremity of the aperture 46, in the fixed blade bar 40, and the cutting edge 64 on the movable cutting blade bar 42 cooperate in a scissor-like manner to cut the bone. In this manner, no sharp edges are created on the severed bone, bone dust is non-existant and a chipless severance is accomplished.

Figure 6:
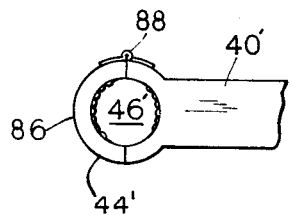
FIGURE 6 is a top view of an alternative embodiment of the cutting areas.

Although the prepared form of the movable cutting blade bar has been described, an alternative form may be seen in FIGURE 6. In this form the forwardmost portion 86 of the outwardly flared end portion 44' may be hingedly connected to the fixed blade bar 40'. With this construction the bone to be cut may be placed in the aperture 46' merely by opening the hinge 90 and positioning the bone to be cut against the rearmost portion of the aperture 46' and thereafter closing the forwardmost portion 86 of the fixed blade bar 42' around the bone and locking the same in the closed position shown in FIGURE 6. The cutting operation remains exactly the same since the alignment of the cutting edges and the general arrangement of elements, as previously described remains the same.

Although the fixed blade bars 40, has been shown and described having an outwardly flared portion 44 this construction leads to a more sturdy construction is not limited thereto. The fixed blade bar may take various shapes without departing from the essence of the invention as described.

While in accordance with the patent statutes a preferred embodiment of the present invention has been illustrated and described in detail, it is to be particularly understood that the invention is not limited thereto or thereby.

We claim:

1. A bone cutting instrument comprising a middle frame portion, a spring actuated handle integral with said middle frame portion, a movable cutting bar releasably insertable in said middle frame portion and adapted to slide over said fixed cutting bar, said movable cutting bar having a front end and being provided with a cutting edge contiguous with said fixed blade bar, said fixed blade bar being provided with an outwardly flared end and a rear end, said outwardly flared end having an aperture therein to accept a bone to be cut, a cutting surface disposed on the outwardly flared end of said fixed cutting bar, said cutting surface being in planar alignment with the cutting edge of said movable blade bar, means disposed on said spring actuated handle in communication with said movable cuting bar for imparting cutting movement to said movable cutting bar, a guide clamp connected to said middle frame portion for holding the cutting bars in alignment and guiding the movement of said movable cutting bar.

2. A bone cutting instrument according to claim 1 wherein said fixed cutting bar and movable cutting bar are insertable in said middle frame portion as a unit.

3. A bone cutting instrument according to claim 2 wherein said outwardly flared end having a cutaway portion leading to said aperture permitting the bone to be cut to be introduced into said aperture, and a cutting surface disposed on the periphery of the said aperture.

4. A bone cutting instrument according to claim 3 wherein said guide clamp is hingedly connected to said middle frame portion and is provided with a pair of downwardly turned sides to maintain the cutting bars in proper cutting alignment, said guide clamp being provided with a guide bar adapted to cooperate with second slot in said movable cutting blade bar for guiding the movement of said movable cutting blade bar.

5. A bone cutting instrument according to claim 3 wherein said fixed blade bar is provided with a hinged front portion, said hinged front portion being adapted to open to accept a bone to be cut.

6. A bone cutting instrument according to claim 4 wherein said guide clamp releasably holds said fixed and movable cutting bars in position on said middle frame portion, said cutting bars being removable when said guide clamp is lifted from its locked position to its open position.

References Cited

UNITED STATES PATENTS

| 1,347,651 | 7/1920 | Nauth | 128—309 |
| 1,397,677 | 11/1921 | Carstens | 128—309 |
| 650,496 | 5/1900 | Stohlmann et al. | 128—309 |

FOREIGN PATENTS

| 348,047 | 5/1937 | Italy. |
| 434,620 | 9/1935 | Great Britain. |
| 663,074 | 7/1938 | Germany. |

LAWRENCE W. TRAPP, Primary Examiner

M. F. MAJESTIC, Assistant Examiner